May 29, 1951 J. R. LONG ET AL 2,554,535
CONTROL DEVICE
Filed Feb. 25, 1947 3 Sheets-Sheet 1

INVENTORS
John Robert Long
BY George O. Puerner
Nicholas Lauger
ATTORNEY

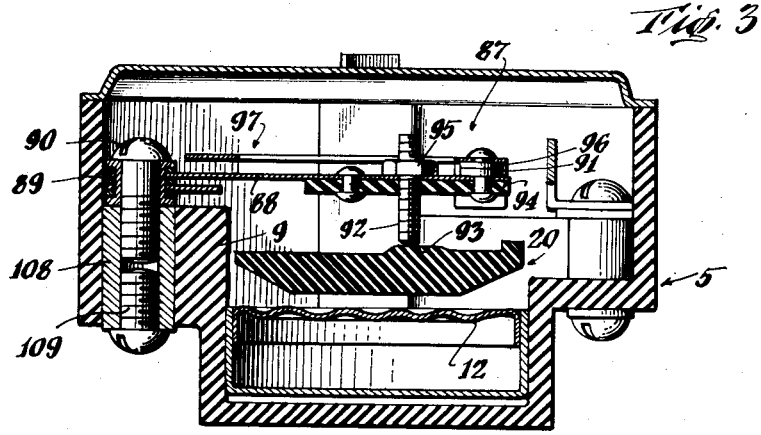
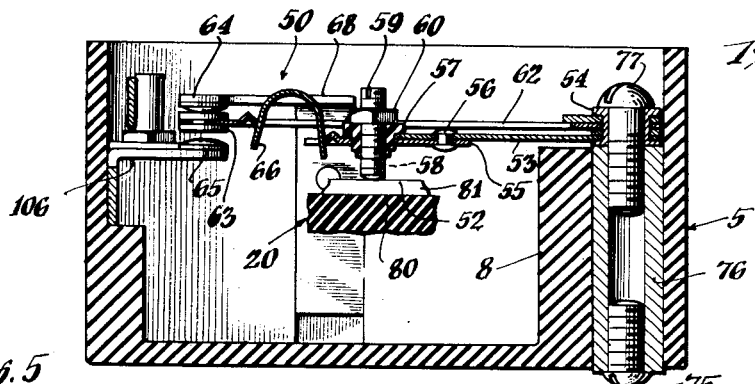
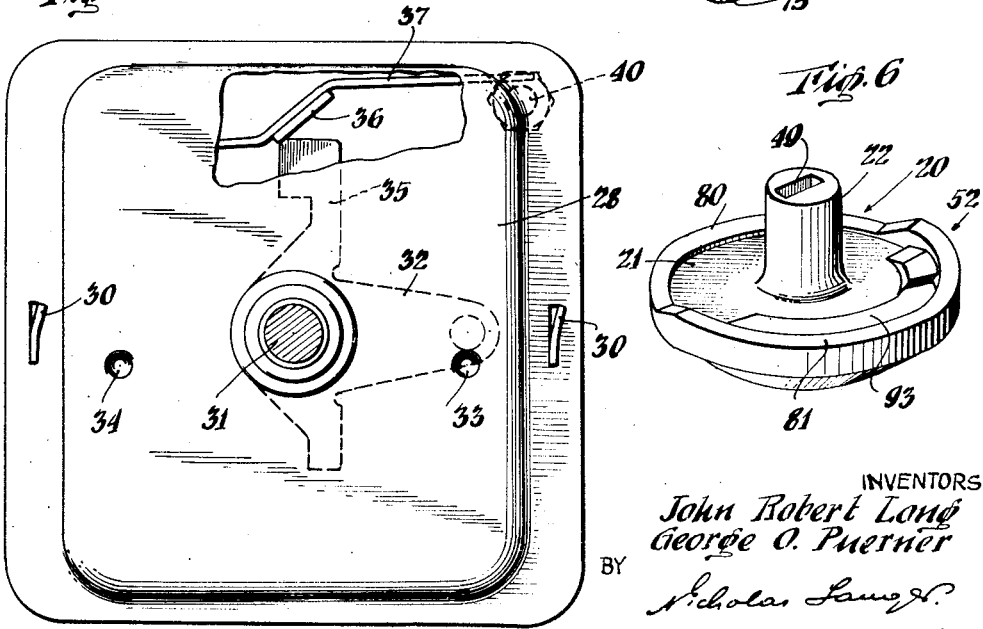

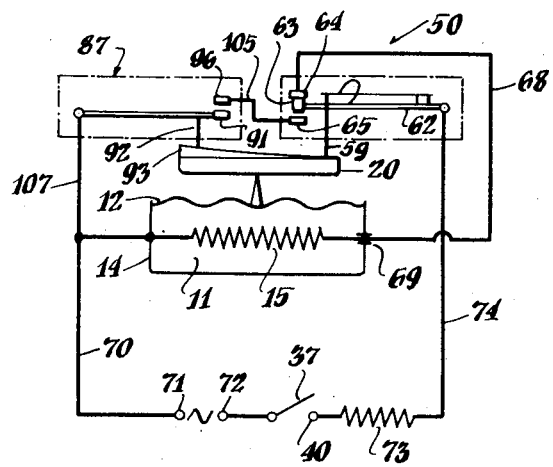
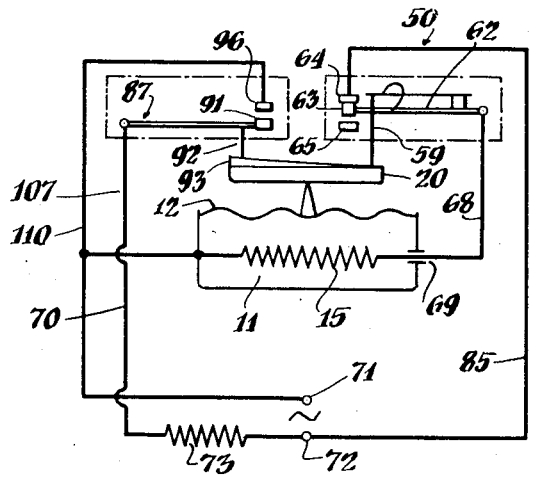
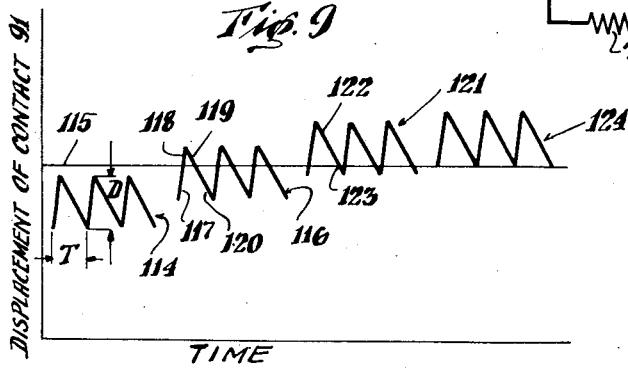
INVENTORS
John Robert Long
BY George O. Puerner
Nicholas Langer
ATTORNEY Patented May 29, 1951

2,554,535

UNITED STATES PATENT OFFICE 2,554,535

CONTROL DEVICE

John Robert Long and George O. Puerner, Indianapolis, Ind., assignors to P. R. Mallory & Co., Inc., Indianapolis, Ind., a corporation of Delaware Application February 25, 1947, Serial No. 730,856

9 Claims. (Cl. 200—122)

This invention relates to control mechanisms or devices and, more particularly, to such devices for varying the effective current supplied to a load such, for example, as an electric heating element.

Heretofore, temperature control of resistive heating loads, such as electric range surface elements, has ordinarily been accomplished by the use of surface elements in the form of multi-sections resistors, control of which is effected by a multi-position switch so arranged that it can apply various voltages across the different sections individually or in series, parallel, or series-parallel combinations. A disadvantage of this system of control resides in the fact that the various sections of the surface element are necessarily switched in and out of the circuit by steps so that continuous variation of the current from the minimum to the maximum value is, as a practical matter, impossible to obtain.

The disadvantages of such step by step control are eliminated, in accordance with this invention, by providing a control device which may be adjusted as desired to vary the effective current supplied to a load. This result is accomplished by utilizing a cycling mechanism which establishes repeated cycles of operation of uniform duration. This cycling mechanism cooperates with a cam to normally energize the load or other controlled device throughout a portion of each cycle and deenergize the load or controlled device during the remainder of each cycle. The cam is adjustable, as by rotation thereof, to vary the proportion of each cycle during which the controlled device is energized. If, for example, the controlled device is a resistive heating element and the cam is adjusted so as to energize such heating element for 20% of each cycle, the effective current supplied to the heating element over a number of cycles will be 20% of the maximum load current. Similarly, if the heating element is energized for 80% of each cycle, the effective current will be 80% of the maximum load current. In accordance with this invention, the effective current may be varied from 5% to 95% or even from 0% to 100% of the maximum load current by adjustment of the cam. This adjustment is continuous, as distinguished from step by step adjustment, so that any desired effective current within the range may be immediately obtained by setting the cam to the desired position.

In the copending application of Long and Stroh, Serial No. 676,969, a novel self-cycling device is described and claimed which utilizes a sealed fluid-containing chamber and a movable member or diaphragm actuated by the expansion and contraction of the fluid in said chamber. A resistive heating element is disposed in heat transfer relation with the fluid and this heater is controlled by a switch or snap action device which energizes the heater when the temperature within the chamber falls to a lower limit and deenergizes the heater when the temperature in the chamber rises to an upper limit. In this manner, the fluid within the chamber is cyclically expanded and contracted thereby effecting cyclical movement of the member or diaphragm.

In accordance with this invention, the cyclically movable member or diaphragm described in the aforesaid copending application is utilized to effect cyclical movement of a cam along its axis thereby to periodically adjust a controlled device by means of a cam-actuated switch. The operating position of the switch may be changed by rotating the cam with resultant variation in the percentage of each cycle during which the controlled device is energized. This invention resides in the concept of the cyclically operated cam-actuated control device together with the structure and circuit arrangements in which this concept is embodied.

It is an object of this invention to improve the construction and operation of control devices and particularly of control devices for varying the effective current supplied to a load.

It is a further object of the invention to provide a cam controlled switch device in which the switch is periodically adjusted by cyclic movement of the cam and in which the switch is also adjusted by moving the cam so as to effect a non-periodic adjustment of the control device.

It is a still further object of the invention to provide a practical and effective range control which may be used to continuously vary the output of a resistive heating element within a range defined by a no load position and a full load position.

It is a still further object of the invention to provide a control which is inherently free from the effects of ambient temperature variations and the necessity of providing an auxiliary temperature compensation device.

It is a still further object of the invention to provide a combination of a self-cycling device utilizing a diaphragm chamber with adjusting means for varying the proportion of each cycle during which a controlled device is energized.

It is a still further object of the invention to provide a control device for varying the effective current supplied to a resistive heating load which is simple, economical and reliable in operation.

Various other objects of the invention will be apparent from the following description and accompanying drawings taken in connection with the appended claims.

The invention accordingly comprises the features of construction, combination of elements, arrangement of parts, and methods of manufacture referred to above or which will be brought out and exemplified in the disclosure hereinafter set forth, including the illustration in the drawings, the scope of the invention being indicated in the appended claims.

For a fuller understanding of the nature and objects of the invention as well as for specific fulfillment thereof, reference should be had to the following detailed description taken in connection with the accompanying drawings, in which:

Figure 1 is a plan view of the control device with the cover removed;

Figures 2, 3 and 4 are, respectively, sectional views taken along the lines 2—2, 3—3 and 4—4 of Figure 1;

Figure 5 is a plan view of the control device with the cover partially broken away to show a feature of the invention;

Figure 6 is a perspective view of the cam;

Figure 7 is a schematic circuit diagram illustrating the circuit of the present invention;

Figure 8 is a schematic diagram showing a modification of the invention; and

Figure 9 is a graph illustrating a feature of the invention.

Figure 1:
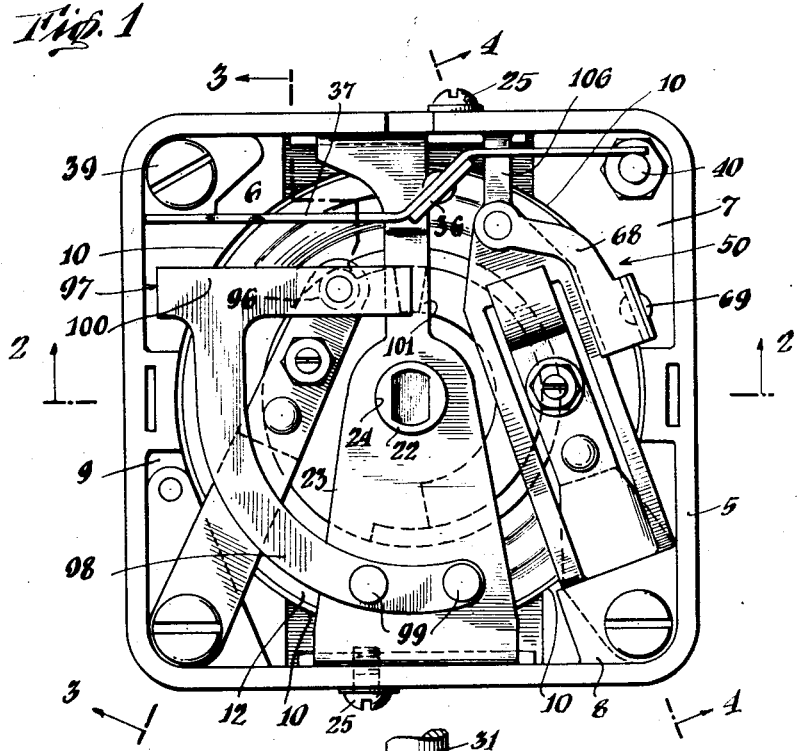
Figure 2:
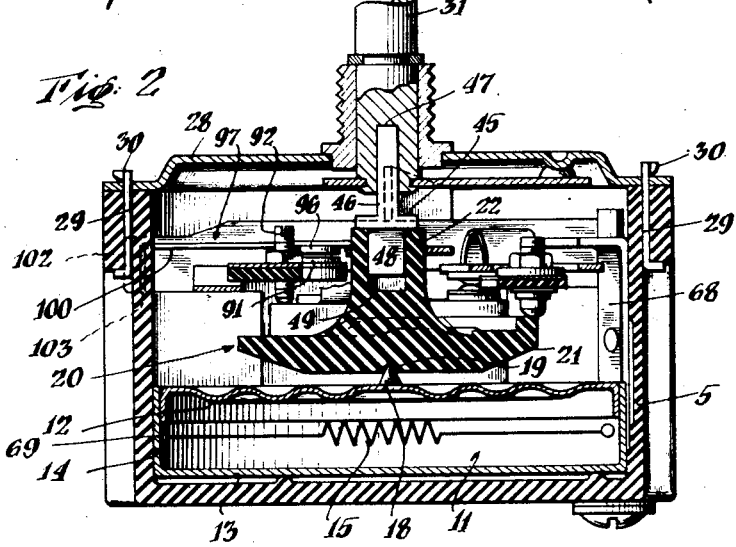

Referring now to the drawings, and particularly to Figures 1 and 2, the novel control device is mounted within a housing 5 which is formed of a suitable insulating material such as "Bakelite." The housing is shaped to form shoulders 6, 7, 8 and 9 at the respective corners thereof, each shoulder having an arcuate inner edge 10. In this manner, the housing is adapted to receive a sealed chamber 11, which is defined by a movable member 12 and a base 13 having an integral cylindrical casing 14 upstanding therefrom. The chamber 11 contains a suitable heat expansible fluid, such as air, and a heater element 15 is mounted within the chamber to effect expansion and contraction of this fluid with resultant movement of the member 12. The heater 15 may, if desired, be mounted outside the chamber provided that the heated element is in heat transfer relation with the expansible fluid so that energization thereof will cause the fluid inside the chamber to expand.

In a preferred embodiment of the invention, the movable member 12 is a diaphragm which responds uniformly to the changes in temperature within the chamber occasioned by the energization and deenergization of heater element 15. However, the member 12 may, if desired, consist of a bellows or any other means which is movable responsive to the changes in temperature and pressure of the fluid within chamber 11.

A pivot member 18 is secured to the central portion of the diaphragm and this pivot cooperates with a recessed portion 19 of a rotatable cam 20 which comprises a body 21 and an integral upstanding cylindrical portion 22. The cam is preferably formed of an insulating material, such as "Bakelite," and it is maintained in an upright position by a metal bridge 23 which has an opening 24 therein of slightly larger diameter than the cylindrical cam portion 22. The bridge 23 is firmly secured to opposite sides of the housing as by screws 25 and it will be apparent that this bridge maintains the cam in an upright position as the latter is moved axially responsive to the expansion and contraction of diaphragm 12.

A cover 28 fits over an open end of the housing 5 and is secured in position thereon by clamps 29 which fit into suitable apertures in the housing and which may be twisted as at 30 to clamp the cover in position upon the housing. A control shaft 31 is journaled in a suitable bushing on cover plate 28 and this shaft carries a stop member 32, Figure 5, which is adapted to engage stops or dimples 33, 34 formed in the cover plate. These stops limit the rotation of shaft 31 to an operating range of approximately 180 degrees.

The shaft also carries a cam portion 35 which is adapted to engage a cam follower 36 mounted on a spring or contact arm 37. The spring arm is secured to the housing shoulder 6, Figure 1, by a screw 39 and this arm is normally biased, by its inherent resiliency, into engagement with a contact post 40 which protrudes from the shoulder 7. The arm 37 and post 40 constitute the main switch of the control device and this switch is closed when the stop member 32, Figure 5, is positioned in its normal operating range between the dimples 33 and 34. However, when stop member 32 moves into engagement with the dimple 33, the shaft 31 is disposed at its "off" position and cam portion 35 engages the follower 36 to move spring arm 37 away from contact post 40 with the result that the main power circuit is broken.

A lost motion connection is provided between the shaft 31 and the cam 20 so that these parts may rotate together without interfering with the axial motion of the cam resulting from the expansion and contraction of the diaphragm 12. To this end, a flanged connecting link 45, Figure 2, is provided having a connector portion 46 which extends into an elongated slot 47 formed in shaft 31 and having a connector 48 which extends into a slot 49 formed in the cylindrical cam portion 22. The depth of the slot 47 is such that the cam 20 may move axially in response to movement of the diaphragm without the member 46 engaging the end of the slot and without the flanged portion of the connector engaging the inner end of the shaft. It will be apparent that the link 45 permits axial movement of the cam 20 and also connects the cam and the shaft so that these parts rotate together at all times.

A snap action switch device 50 is mounted on the housing shoulder 8, Figure 1, and this snap action device is actuated by an outer stepped cam surface 52, Figure 6, of cam 20. The snap action switch device comprises an actuating spring 53, Figure 4, which is secured at one end thereof to a stack assembly 54 mounted on the shoulder 8. The other end of the actuating spring carries a lever 55 which is secured thereto by a rivet 56 and which is sufficiently rigid to support a bushing 57 having a threaded interior passage 58 for receiving an exteriorly threaded actuating member 59. A nut 60 is provided for permitting adjustment of the actuating member and for holding it in fixed position within the bushing. It will be observed that the lower end of the member 59 rests on the stepped cam surface 52 and is urged into engagement therewith by the inherent resiliency of spring 53.

An actuated arm or spring 62 is secured, at one end thereof, in stack assembly 54 and this spring carries, at its other end, a movable contact 63 which is engageable with fixed contacts 64 and 65. A U-shaped snap action spring 66 extends through suitable slots which are formed, respectively, in the free end of lever 55 and in an intermediate portion of the actuating member 59, the spring engaging knife edge bearings defined, respectively, by struck up portions protruding angularly from such slotted portions. The novel construction and arrangement of the snap action switch device are described in more detail by the copending application, Serial No. 676,969, filed June 15, 1946.

With the parts in the position shown by Figure 4, in which contacts 63, 64 are closed and contacts 63, 65 are open, upward movement of the actuating member past a first critical position will cause the actuated spring 62 to move downwardly by snap action thus opening contacts 63, 64 and closing contacts 63, 65. Thereupon, movement of the actuating member downwardly, Figure 4, beyond the first critical position to a second critical position will cause the actuated spring to move upwardly by snap action to the position shown in Figure 4 thus closing contacts 63, 64 and opening contacts 63, 65.

In accordance with the invention, the snap action switch 50 is utilized to effect repeated cyclic movement of the diaphragm 12 and cam 20. To this end, the fixed contact 64 is mounted on a metal bracket 68, Figures 1, 2 and 4, which is supported by the housing and connected through a seal 69 to one end of the heater element 15. Referring to the circuit diagram of Figure 7, it will be seen that the other end of the heater is connected by a conductor 70 to a terminal 71 of a suitable current source. Preferably, this connection is effected by securing said other end of the heater to the casing 14 and welding or otherwise attaching a lead to the base of casing 14, this lead extending through a suitable opening, not shown, in the bottom of the housing 5. The other terminal 72 of the power source is connected to a load 73, such as a resistive heating element, which, in turn, is connected by a conductor 74 to actuated member 62 and movable contact 63. This latter connection may be effected by attaching conductor 74 to a screw 75, Figure 4, which is connected to actuated member 62 and movable contact 63 through a metal bushing 76, a stack supporting screw 77 and the stack assembly 54. It will be apparent that a circuit is formed, in this manner, which includes the power source 71 and 72, load 73, snap action switch contacts 63, 64 and heater element 15.

Assuming that the actuating member 59 is positioned on the depressed portion 80 of cam surface 52 and that the contacts 63, 64 are closed, the heating element 15 is energized by the circuit just described with the result that the fluid within the chamber 11 is expanded thus causing the diaphragm 12 to move outwardly. Responsive to the expansion of the diaphragm, the cam 20 moves axially toward the cover 28 and the actuating member 59 is moved upwardly, Figure 4, to its first critical position. Thereupon, actuated member 62 is depressed by snap action thus opening contacts 63, 64 and breaking the heater circuit. As a result, the fluid within the chamber 11 commences to cool, the resultant contraction of diaphragm 12 moving the cam 20 and actuating member 59 downwardly, Figure 4. As the actuating member 59 reaches its second critical position, the actuated member is raised by snap action thereby closing contacts 63, 64 and energizing heater element 15 to start a new cycle of operation. It will be apparent that the diaphragm passes through repeated cycles of operation, the heater element being energized when a lower temperature limit is reached within the chamber and then being deenergized when an upper temperature limit is reached. As a result, the cam 20 is cyclically moved back and forth along its axis.

The heater 15 is so adjusted that the heating period, that is, the interval during each cycle when the heater is energized, is substantially shorter than the cooling period or interval, during each cycle, when the heater is deenergized. With the circuit shown in Figure 7, the heater is connected in series with the load and power source during the heating period while, in the circuit of Figure 8, in which parts similar to the components of Figure 7 are indicated by like reference characters, the heater 15 is independent of the load and is connected directly across the power supply during the heating period. To this end, the terminal 72 of the power source is connected directly to the actuated member 62 and contact 63 by a lead 85. It will be apparent that the circuit of heater element 15, Figure 8, is controlled directly by the contacts 63, 64 and is independent of the load 73.

The depressed cam portion 80 is positioned so that the control member 59, Figure 4 is in engagement therewith when the stop member 32 is in its normal operating range between stops 33 and 34. Should the shaft be turned so as to force the member 32 beyond stop 33, for example, and out of its normal operating range, the cam is rotated so that the control member 59 engages a raised portion 81 of stepped cam surface 52. Thereupon, the control member 59, Figure 4, is raised sufficiently to actuate the snap action switch 50 and open contacts 63, 64 regardless of the position of the diaphragm. Accordingly, operation of the heater 15 is prevented when shaft is moved outside its normal operating range. In the event that it is not desired to provide this safety feature, the control member 59 may be actuated directly by the diaphragm 12 without the intervention of the cam 20.

In accordance with the invention, a cam-actuated switch 87, Figure 3, is provided for controlling the percentage of each cycle during which the load circuit is energized. This switch comprises a contact arm 88 which is attached to a stack assembly 89 fixed on the shoulder 9 by a screw 90. The arm 88 carries, at the free end thereof, a contact 91 and this arm is actuated by an exteriorly threaded member 92 which rests on a tapered inner surface 93 of cam 20 and is urged into engagement therewith by the inherent resiliency of the contact arm 88. A block 94 of insulating material may be riveted to the contact arm for supporting actuating member 92 and this block has an interiorly threaded passage, not shown, for receiving the exterior threads of the member 92. A nut 95 is provided for adjusting the vertical position of actuating member 92 and for securing it in position on the contact arm 88 and block 94.

Cooperating with the contact 91 is a contact 96 which is mounted on a spring arm 97, Figures 1 and 3. The arm 97 includes an arcuate portion 98 which is riveted at 99 to the body of bridge member 23 together with an integral straight portion 100, one end of which rests on the upper surface of a narrow portion 101 of the bridge 23. The other end of the straight portion 100 is bent downwardly as at 102, Figure 2, and rests upon a portion 103 of the housing shoulder 6. The inherent resiliency of the spring arm 97 urges the contact-carrying portion 100 into engagement with the bridge at 101 and into engagement with the shoulder at 103. As a result, the contact 96 is normally maintained in a fixed position spaced from movable contact 91. When the actuating member 92 is raised, Figure 3, responsive to upward movement of the cam 20, contact 91 moves toward and engages contact 96. Thereafter, as actuating member 92 continues to rise, contact 91 moves with contact 96 while remaining in engagement therewith, the arm 97 being lifted from engagement with the bridge portion 101 and shoulder 6 to permit movement of the contacts as a unit.

It will be observed that the contact actuating member 92 partakes of the cyclic movement of cam 20 along its axis which is caused by the periodic expansion and contraction of the diaphragm. Responsive to this cyclic longitudinal movement of actuating member 92, the contacts 91, 96 are adapted to be closed during a portion of each operating cycle thereby to control and periodically energize the load circuit. Referring to Figure 7, it will be seen that the contact 96 is connected to the fixed contact 65 of snap action switch 50 by a conductor 105. In the structure of Figures 1 and 4, this connection is effected by a metal bracket 106 which carries fixed contact 65, this bracket preferably being integral with the metal bridge 23 which carries spring member 97 and contact 96. In Figure 7, the contact 91 is connected by a lead 107 to conductor 70 and the terminal 71 of the power source. This connection may be made by means of the spring arm 88 and the screw 90, Figure 3, the latter being mounted in a metal bushing 108 extending through a suitable passage in the housing and having a screw 109 secured therein for receiving conductor 107 which is thereby electrically connected to the spring arm 88 and contact 91. Accordingly, it will be apparent that the load circuit in Figure 7 is controlled both by the contact set 63, 65 and the contact set 91, 96 of which the latter set opens and closes periodically responsive to the cyclic axial movement of the cam 20.

In the modified circuit of Figure 8, the load is controlled only by the contacts 91 and 96. To this end, the contact 96 is connected by a conductor 110 to the load 73 and power supply terminal 72. It will be apparent that the load circuit and the circuit of the heater element 15 are independent in Figure 8, the former being controlled by the contacts 91, 96 and the latter being controlled by the contacts 63, 64 of snap action switch 50, the contact 65 acting merely as a stop when the modified circuit is utilized.

With either circuit, the main control switch 37, 40 of Figures 1 and 4 may be inserted at any suitable portion of the circuit to cut off the current when the shaft 31 is moved to its "off" position. With the circuit of Figure 7, the main switch is preferably connected between terminal 72 and the lead 73 while, with the circuit of Figure 8, it is preferably connected between terminal 72 and conductor 70.

The operation of the control device is as follows:

Referring to Figure 8, and assuming that the power supply is energized, the circuit of heater element 15 is closed through contacts 63, 64 thereby heating and expanding the fluid within the chamber 11. Accordingly, the fluid within the chamber is heated from ambient temperature to a lower temperature limit which is preferably well above ambient temperature thereby causing an initial expansion of diaphragm 12 with resultant axial motion of the cam 20 and actuating member 59. As the temperature of the chamber reaches an upper temperature limit, the diaphragm is expanded sufficiently to move actuating member 59 to its first critical position, thus actuating the snap action switch 50 and opening contacts 63, 64. Thereupon, the heater element 15 is deenergized and the fluid within the chamber begins to cool, the resultant inward movement of the diaphragm effecting reverse movement of the cam 20 and actuating member 59. When the temperature of the fluid reaches the aforesaid lower temperature limit, actuating member 59 reaches its second critical position and snap action switch 50 is actuated to close the contacts 63, 64 and start a new cycle of operation. Accordingly, the cam 20 moves cyclically back and forth along its axis thereby effecting cyclic movement of the actuating member 92 of switch 87.

In accordance with the invention, the rotary position of the cam 20, as determined by the setting of shaft 31, determines the length of time, during each cycle, that the contacts 91, 96 are closed and, thus, the effective current supplied to the load over a number of cycles. Assuming that the actuating member 92 is in engagement with the lowest portion of tapered cam surface 93, the displacement of actuating member 92 in response to the cyclic axial movement of the cam 20 is insufficient to cause the contacts 91, 96 to close during any part of the operating cycle. This condition is shown by the plot 114 of Figure 9 wherein the ordinate represents the displacement of contact 91, the abscissa represents time, and the horizontal line 115 represents the position at which contact 91 engages contact 96. It will be noted that the line 114, representing the position of contact 91 as it is cyclically displaced by the cam, at no place touches the line 115 so that the contacts 91, 96 remain open throughout the entire cycle and no current is supplied to the load.

Assuming that the cam 20 is rotated so that the actuating member 92 engages an intermediate portion of tapered cam surface 93, the actuating member 92 and the contact 91 are shifted relative to contact 96 independently of the cyclic movement of the cam, as indicated by the plot 116, Figure 9. As a result, during a portion of each cycle, the contact 91 moves toward contact 96, as indicated by the portion 117 of the curve, and the contacts 91, 96 are open during this period. As contact 91 reaches the position 115, the contacts are closed and thereafter contact 96 moves along with contact 91 while remaining in engagement therewith until the actuating member reaches its position of maximum displacement, as indicated by the portion 118 of the curve. During this portion of the cycle, the spring arm 97 carrying contact 96 is raised from its normal position in engagement with the bridge at 101 and housing at 103, Figures 1 and 2, by the upward movement of contact 91 and actuating member 92. The actuating member 92 then returns toward its original position, the contacts remaining in engagement until the position 115 is reached, as indicated by the portion 119 of the curve. Thereupon, the contacts break and remain open until the actuating member returns to its original position, as indicated by the portion 120 of the curve. Accordingly, the contacts 91, 96 and the load circuit are open during the portions 117, 120 of each cycle and closed during the portions 118 and 119.

Assuming that the cam is again rotated in the same direction, the actuating member 92 and contact 91 are again shifted upwardly with respect to the contact 96, independently of the cyclic movement of the cam, as indicated by the plot 121. Accordingly, the closed contact periods 122 of each cycle are longer and the open contact periods 123 are correspondingly shorter. When the cam is moved so that the highest portion of the tapered cam surface 93 is engaged by the actuating member 92, the contacts 91, 96 are closed throughout the whole of each operating cycle and the load is continuously energized. This condition is illustrated by the plot 124.

It will be apparent that the position of the cam 20 determines the relative length of the closed and open contact periods during each cycle. That is to say, the setting of the cam determines the percentage of each cycle during which the contacts are closed. Over a number of cycles, therefore, the cam setting fixes the effective value of the current supplied to the load and this effective current may be continuously varied within a range defined by 0% of the total load current, as in graph 114, and 100% of the total load current, as in graph 124, merely by rotation of the cam.

It will be further apparent that this result is accomplished by the interaction at actuating member 92 of the cyclic movement resulting from periodic expansion and contraction of the diaphragm with the non-periodic adjustment of actuating member 92 resulting from changing the setting of cam 20. Broadly speaking, therefore, the switch 87 may be considered to be a controlled device which is responsive to the cyclic movement of the diaphragm and which is also responsive to non-periodic adjustment by the cam 20 so that the period of energization thereof during each cycle may be varied by adjustment of the cam. More specifically, the switch 87 may be considered to consist of a pair of contacts 91 and 96, one or both of which are adjustable by an actuating member either directly, as in the illustrated embodiment, or indirectly, as through a snap action device. One such actuating member is cyclically moved, in accordance with the invention, so that the contacts are adapted to be opened and closed during each operating cycle. Further in accordance with the invention, a cam is provided for adjusting either the cyclically movable actuating member or an actuating member controlling the other contact, the cam being adapted to move its associated actuating member relative to one of said contacts thereby to vary the proportion of each cycle during which the contacts are closed.

Accordingly, without limiting the scope of the invention, it is to be distinctly understood that the following modifications are expressly included therein. First, the contacts 91, 96 may be normally closed instead of normally open, as shown. This may be accomplished by mounting contact 96 between contact 91 and the cam and biasing contact 96 into engagement with contact 91, suitable stop means being provided to limit the travel of said contact 96 as it is displaced with contact 91. Second, cyclic movement may be imparted to contact 96 instead of contact 91 by an actuating member movable with the diaphragm 12, the position of contact 91 being controlled solely by adjustment of the cam. Third, a snap action device may be utilized to operate contacts 91 and 96. Fourth, in some aspects of the invention, other means may be utilized to effect cyclic movement of actuating member 92 instead of the novel diaphragm chamber of this invention. Fifth, in some cases, a bellows or other expansible member may be substituted for the diaphragm 12.

It is a feature of the invention that the length of the operating cycles is substantially unaffected by ambient temperature variations. This is explicable on the basis that the fluid temperature within the chamber varies between an upper temperature limit and a lower temperature limit during each cycle and both of these temperatures are substantially above ambient temperature. Accordingly, these temperature limits are substantially unaffected by variations in ambient temperature. As a result, although ambient temperature changes may affect the rate of cooling of the fluid within the chamber 11 and, hence, the length or elapsed time of the operating cycle, such temperature changes do not affect the total displacement of the diaphragm within the aforesaid temperature limits. Reverting to Figure 9, it will be seen that the percentage of closed circuit time during each cycle is determined, first, by the total displacement D of the contact 91 during each cycle which is not, as stated, affected by ambient temperature variations and, second, by the vertical position of the curve with respect to the line 115, which is controlled by the adjustment of the cam 20 and is also unaffected by ambient temperature variations. Accordingly, the percentage of each cycle during which the load is energized or the effective current supplied over a number of cycles is likewise unaffected by ambient temperatures. As stated, changes in ambient temperature may change the total time T of each cycle. However, such variations would merely spread out the curve along the time axis without affecting the displacement D or the vertical position of the curve with respect to the line 115. Accordingly, such changes do not vary the percentage of each cycle during which the load is energized.

The circuit of Figure 7 operates in substantially the same manner as the circuit of Figure 8. However, in this circuit, the load is connected in series with the heating element 15 during the heating period therefor regardless of the position of contacts 91, 96. At the end of the heating period, the contacts 63, 64 are opened to deenergize the heater element thereby starting the cooling period and the contacts 63, 65 are closed to place the contacts 91, 96 in circuit with the load. Accordingly, in this modification, the latter contacts control the percentage of the cooling period during which the load is energized, this percentage being determined by the setting of the cam 20. The load circuit is thus energized throughout any desired portion of the cooling period and, at reduced voltage, throughout the entire heating period, during which period the load and heater element are connected in series.

While the present invention, as to its objects and advantages, has been described herein as carried out in specific embodiments thereof, it is not desired to be limited thereby but it is intended to cover the invention broadly within the spirit and scope of the appended claims.

What is claimed as new and desired to be secured by Letters Patent is:

1. In a control device for varying the effective current supplied to a load, a housing, a sealed chamber containing a heat expansible fluid mounted in said housing, a movable member forming a part of said chamber, a heater for expanding the fluid in said chamber thereby to move said member, a rotatable cam movable axially with said member, means for effecting repeated cyclic movement of said member including a snap action switch device actuated by a flat surface of said cam and connected in circuit with said heater, and a set of contacts for controlling a load circuit actuated by a tapered surface of said cam whereby said contacts are adopted to be cyclically opened and closed responsive to the cyclic movement of said member, rotation of said cam varying the length of the closed contact period during each cycle.

2. In a control device for varying the effective current supplied to a resistive heating load, a housing, a sealed chamber containing a heat expansible fluid mounted in said housing, a diaphragm forming a part of said chamber, means for effecting cyclical expansion and contraction of said diaphragm including a heater mounted in said chamber, and a snap action switch device connected in circuit with said heater and actuated by said diaphragm, a set of contacts for controlling a load circuit, an actuator adapted to cause said contacts to cyclically open and close, said actuator including a pivot member movable with said diaphragm, a rotatable cam movable axially by said pivot member, and a contact-actuating member actuated by a tapered surface of said cam, said contact-actuating member controlling the movement of one of said contacts which, during each cycle, is adapted to engage the other contact and means for maintaining the engagement of said contacts on further expansion of said diaphragm, and means for rotating said cam thereby to vary the proportion of each cycle during which the contacts are closed.

3. In a control device for varying the effective current supplied to a load, a housing, a sealed chamber containing a heat expansible fluid mounted in said housing, a diaphragm forming a part of said chamber, a heater for expanding the fluid in said chamber thereby to move said diaphragm, a snap action switch device comprising a first and second set of contacts actuated by said diaphragm, said first set being connected in circuit with said heater so that the heater is energized when the temperature in the chamber reaches a lower limit and deenergized when the temperature in the chamber reaches an upper limit whereby the diaphragm passes through repeated cycles of operation, each cycle consisting of a heating period and cooling period, said second set of contacts being open during the heating period and closed during the cooling period, a switch device comprising a third set of contacts connected in circuit with said second set for controlling a resistive heating load, an actuator for said third set of contacts including a rotatable cam movable axially with said diaphragm, and a contact-actuating lever controlled by a tapered surface of said cam whereby said third set of contacts is adapted to be cyclically opened and closed responsive to the expansion and contraction of said diaphragm, and means for rotating said cam thereby to vary the proportion of each cycle during which the third set of contacts is closed.

4. In a control device for varying the effective current supplied to a load; a housing; a chamber containing a heat expansible fluid mounted in said housing; a heater disposed in said housing in heat transfer relation with said fluid, a member movable in response to the expansion and contraction of said fluid; a cam movable with said member; a snap action switch device comprising an actuating arm operated by a flat surface of said cam, an actuated arm having a movable contact thereon, and a fixed contact associated with said movable contact, said fixed contact being connected to the heater element; a second switch device actuated by a tapered surface of said cam; and means for rotating said cam to change the adjustment of said second switch device.

5. In a control device for varying the effective current supplied to a load; a housing; a diaphragm chamber containing an enclosed heating element mounted in said housing; a rotatable cam movable with said diaphragm; a snap action switch device comprising an actuating arm operated by a flat surface of said cam, an actuated arm having a movable contact thereon, and a fixed contact connected to the heater element; a second switch device actuated by a tapered surface of said cam; and means for rotating said cam to change the adjustment of said second switch device.

6. In a control device for varying the effective current supplied to a load; a housing; a diaphragm chamber containing an enclosed heating element mounted in said housing; a rotatable cam movable axially with said diaphragm; a cover adapted to fit over an open end of said housing; a control shaft journaled in said cover, said shaft having a lost motion connection for effecting rotation of said cam while permitting expansion and contraction of said diaphragm; a snap action switch device comprising an actuating arm operated by a flat surface of said cam, an actuated arm having a movable contact thereon, and a fixed contact connected to the heater element; and a second switch device actuated by a tapered surface of said cam.

7. In a control device for varying the effective current supplied to a load, a housing, a diaphragm chamber containing an enclosed heating element mounted in said housing, a rotatable cam movable axially with said diaphragm, a cover adapted to fit over an open end of said housing, a control shaft journaled in said cover, said shaft having a lost motion connection for effecting rotation of said cam while permitting expansion and contraction of said diaphragm, a pair of stop members protruding from said cover to limit the rotation of said shaft, said shaft having a cam portion extending therefrom which is adapted for engagement with said stop members, a snap action switch device mounted in said housing and actuated by a flat surface of said cam, and a second switch device mounted in said housing and actuated by a tapered surface of said cam, the angular length of said tapered surface and said flat surface being equal to the angular distance between said stop members.

8. In a control device for varying the effective current supplied to a load, a housing, a diaphragm chamber containing an enclosed heating element mounted in said housing, a rotatable cam movable axially with said diaphragm, a cover adapted to fit over an open end of said housing, a control shaft journaled in said cover, said shaft having a lost motion connection for effecting rotation of said cam while permitting expansion and contraction of said diaphragm, stop means defining an operating range of rotation for said shaft, a switch device comprising a pair of contacts, a cam member on said shaft for opening said contacts when the shaft is outside said operating range and for closing said contacts when the shaft is within said operating range, a snap action switch device actuated by a flat surface of said cam and mounted within said housing, and a second switch device mounted in said housing and actuated by a tapered surface of said cam.

9. In a control device for varying the effective current supplied to a load; a housing; a diaphragm chamber containing an enclosed heating element mounted in said housing; a cam supported by the central portion of said diaphragm and movable axially therewith; a cover adapted to fit over the top of said housing; a control shaft journaled in said cover, said shaft having a lost motion connection for effecting rotation of said cam while permitting expansion and contraction of said diaphragm; and a snap action switch device comprising an actuating member operated by a flat surface of said cam, an actuated member having a movable contact thereon, and a pair of fixed contacts associated with said movable contact, one of said fixed contacts being connected to the heater element and the other fixed contact being connected to a second switch device which is actuated by a tapered surface of said cam and which has one terminal thereof adapted for connection to said heater.

JOHN ROBERT LONG.
GEORGE O. PUERNER.

REFERENCES CITED

The following references are of record in the file of this patent:

UNITED STATES PATENTS

| Number | Name | Date |
|---|---|---|
| 214,637 | Edison | Apr. 22, 1879 |
| 1,074,215 | Schuirmann | Sept. 30, 1913 |
| 1,205,434 | Connell | Nov. 21, 1916 |
| 1,497,206 | Booton | June 10, 1924 |
| 1,682,905 | Hill | Sept. 4, 1928 |
| 1,927,934 | Ford | Sept. 26, 1933 |
| 2,060,836 | Taxner | Nov. 17, 1936 |
| 2,275,917 | Newell | Mar. 10, 1942 |
| 2,333,319 | Kucera | Nov. 2, 1943 |
| 2,355,041 | Baak | Aug. 8, 1944 |
| 2,425,030 | Clark | Aug. 5, 1947 |

FOREIGN PATENTS

| Number | Country | Date |
|---|---|---|
| 23,224 | Great Britain | of 1909 |